United States Patent
Schmidt et al.

(10) Patent No.: US 10,739,218 B2
(45) Date of Patent: Aug. 11, 2020

(54) PRESSURE SENSORS WITH TENSIONED MEMBRANES

(71) Applicant: THE ALFRED E. MANN FOUNDATION FOR SCIENTIFIC RESEARCH, Santa Clarita, CA (US)

(72) Inventors: Siegmar Schmidt, Simi Valley, CA (US); William A. Dai, Porter Ranch, CA (US); Boon Khai Ng, La Crescenta, CA (US)

(73) Assignee: THE ALFRED E. MANN FOUNDATION FOR SCIENTIFIC RESEARCH, Santa Clarita, CA (US)

(*) Notice: Subject to any disclaimer, the term of this patent is extended or adjusted under 35 U.S.C. 154(b) by 573 days.

(21) Appl. No.: 15/485,190

(22) Filed: Apr. 11, 2017

(65) Prior Publication Data

US 2017/0292887 A1 Oct. 12, 2017

Related U.S. Application Data

(60) Provisional application No. 62/320,889, filed on Apr. 11, 2016, provisional application No. 62/320,897, filed on Apr. 11, 2016.

(51) Int. Cl.
*G01L 9/00* (2006.01)
*G01L 7/08* (2006.01)
(Continued)

(52) U.S. Cl.
CPC ............ *G01L 9/0075* (2013.01); *G01L 1/142* (2013.01); *G01L 7/082* (2013.01); *G01L 9/0016* (2013.01);
(Continued)

(58) Field of Classification Search
CPC .. G01L 9/0075; G01L 19/0618; G01L 9/0048; G01L 9/0047; G01L 19/04; G01L 19/14; G01L 9/0044
See application file for complete search history.

(56) References Cited

U.S. PATENT DOCUMENTS 4,158,311 A 6/1979 Yasuhara et al.
4,586,109 A * 4/1986 Peters ............... G01L 9/0073
29/25.41

(Continued)

FOREIGN PATENT DOCUMENTS

EP 0 115 908 A2 8/1984

OTHER PUBLICATIONS

Hao et al.; "An annular mechanical temperature compensation structure for gas-sealed capacitive pressure sensor"; ISBN 1424-8220; pp. 8026-8038; Published 2012 (Year: 2012).*

(Continued)

*Primary Examiner* — Daniel S Larkin
*Assistant Examiner* — Anthony W Megna Fuentes
(74) *Attorney, Agent, or Firm* — Lewis Roca Rothgerber Christie LLP

(57) ABSTRACT

Pressure sensors having ring-tensioned membranes are disclosed. A tensioning ring is bonded to a membrane in a manner that results in the tensioning ring applying a tensile force to the membrane, flattening the membrane and reducing or eliminating defects that may have occurred during production. The membrane is bonded to the sensor housing at a point outside the tensioning ring, preventing the process of bonding the membrane to the housing from introducing defects into the tensioned portion of the membrane. A dielectric may be introduced into the gap between the membrane and the counter electrode in a capacitive pressure sensor, resulting in an improved dynamic range.

13 Claims, 11 Drawing Sheets

(51) Int. Cl.
*G01L 9/12* (2006.01)
*G01L 1/14* (2006.01)
*G01L 19/14* (2006.01)
*G01L 19/04* (2006.01)
*G01L 19/06* (2006.01)

(52) U.S. Cl.
CPC .......... *G01L 9/0042* (2013.01); *G01L 9/0044* (2013.01); *G01L 9/0047* (2013.01); *G01L 9/0048* (2013.01); *G01L 9/0072* (2013.01); *G01L 9/0073* (2013.01); *G01L 9/12* (2013.01); *G01L 19/04* (2013.01); *G01L 19/0618* (2013.01); *G01L 19/14* (2013.01); *G01L 19/147* (2013.01)

(56) References Cited

U.S. PATENT DOCUMENTS

| | | | | |
|---|---|---|---|---|
| 5,076,147 | A * | 12/1991 | Hegner | G01L 9/0075 73/715 |
| 5,627,321 | A | 5/1997 | Korhonen et al. | |
| 6,014,800 | A | 1/2000 | Lee | |
| 6,019,002 | A | 2/2000 | Lee | |
| 6,578,427 | B1 * | 6/2003 | Hegner | G01L 9/0075 73/718 |
| 6,807,865 | B2 | 10/2004 | Troyer | |
| 7,073,385 | B2 | 7/2006 | Troyer | |
| 8,429,979 | B2 | 4/2013 | Kuwahara et al. | |
| 8,434,369 | B2 * | 5/2013 | Hou | G06F 3/0414 361/600 |
| 2003/0221493 | A1 * | 12/2003 | Morishita | G01L 9/0075 73/754 |
| 2007/0201710 | A1 | 8/2007 | Suzuki et al. | |
| 2008/0202251 | A1 * | 8/2008 | Serban | G01L 1/142 73/780 |
| 2013/0062710 | A1 | 3/2013 | Dehe | |
| 2013/0263670 | A1 * | 10/2013 | Selders | G01L 9/0075 73/700 |
| 2016/0320256 | A1 * | 11/2016 | Burgard | G01L 9/0072 |

OTHER PUBLICATIONS

Hao et al.; "Fabrication of atmospheric pressure sensors using Au—Au bonding techniques for human activity monitoring"; ISBN 978-1-889335-42-1; Date of conference Sep. 19-13, 2010; Published in 2010 World Automation Congress; pp. 1-5 (Year: 2010).*
ISA Invitation to Pay Fees and, Where Applicable, Protest Fee with Communication (Annex) Relating to the Search Results of the Partial International Search, dated Aug. 1, 2017, Application No. PCT/US2017/027074, 20 sheets.

* cited by examiner

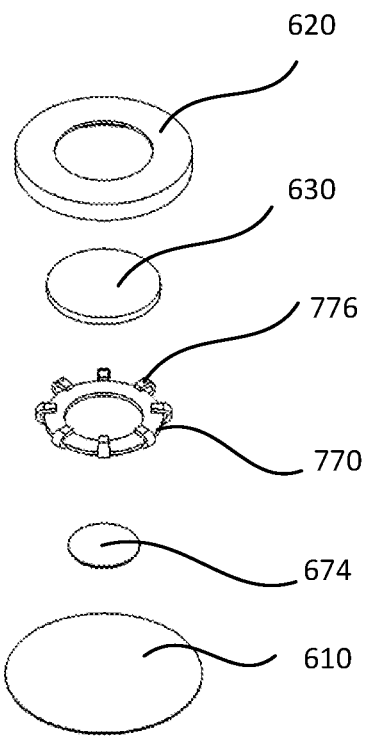
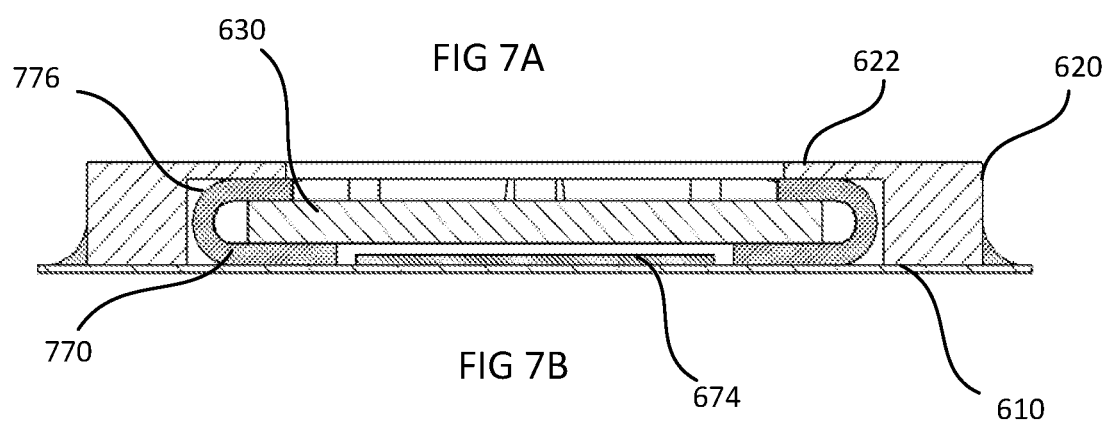
FIG 7A
FIG 7B

PRESSURE SENSORS WITH TENSIONED MEMBRANES

CROSS-REFERENCE TO RELATED APPLICATION(S)

The present application claims priority to and the benefit of U.S. Provisional Application Nos. 62/320,897 and 62/320,889, both filed Apr. 11, 2016, entitled "CAPACITIVE PRESSURE SENSORS WITH RING STABILIZING MEMBRANES", the entire content of which is incorporated herein by reference.

BACKGROUND

The following Background discussion is only for enhancement of understanding of the background of the invention, and therefore it may contain information that does not form the prior art that is already known to a person of ordinary skill in the art.

Some pressure sensors utilize membranes to measure the pressure on the membrane, often relative to a reference pressure inside the pressure sensor. The sensor measures the deflection of the membrane to determine what the pressure differential being experienced by the pressure sensor is. The characteristics of the membrane play a role in determining the magnitude of that deflection. In precision sensors, defects in a membrane such as defects introduced in the process of producing the membrane or defects introduced in the process of fabricating the pressure sensor can prevent a sensor from making accurate readings. Additionally, some pressure sensors require high sensitivity over a large dynamic range, and some pressure sensors such as implantable pressure sensors require a small profile. These two considerations may be at odds. There is an ongoing need for more accurate, more reliable, smaller, and easier to fabricate pressure sensors.

SUMMARY

According to aspects of embodiments of the present disclosure, pressure sensors having ring-tensioned membranes, pressure sensors having plate-tensioned membranes, pressure sensors having improved dynamic ranges, and methods of making the same are disclosed.

In one aspect of the present disclosure, a pressure sensor is provided. The pressure sensor includes a housing having an opening, a membrane coupled to the housing at the opening, a tensioning ring coupled to the membrane configured to apply a tensile force to the membrane, and a sensor circuit in the housing configured to generate a pressure signal based on a deflection of the membrane.

In one embodiment, the membrane has a first coefficient of thermal expansion, the tensioning ring has a second coefficient of thermal expansion lower than the first coefficient of thermal expansion, and the membrane and the tensioning ring are configured to be bonded together when heated to above an operating temperature range while the membrane experiences greater expansion than the tensioning ring and the tensioning ring applies the tensile force to the membrane at the operating temperature range.

In one embodiment, the membrane has a tensioned region and a non-tensioned region, the tensioned region of the membrane is an area of the membrane inside the tensioning ring, the non-tensioned region of the membrane is an area of the membrane outside the tensioning ring, and the non-tensioned region of the membrane is bonded to the housing.

In one embodiment, the pressure sensor includes a counter electrode, a spacer, and an Isolator, wherein the membrane comprises an electrode, the counter electrode is positioned parallel to the membrane, the spacer is positioned between the counter electrode and the membrane to provide a gap between the counter electrode and the membrane, the tensioning ring comprises a retaining portion, the retaining portion of the tensioning ring is configured to hold the counter electrode against the spacer, the Isolator is configured to isolate the counter electrode from the tensioning ring, and the sensor circuit is configured to evaluate a capacitance between the electrode and the counter electrode.

In one embodiment, the isolator includes the spacer.

In one embodiment, the isolator includes a dielectric between the counter electrode and the membrane, the spacer having a first thickness between the counter electrode and the membrane, and the dielectric having a second thickness less than the first thickness.

In one embodiment, the membrane is a thin sheet of metal.

In one embodiment, the membrane comprises titanium, stainless steel, or an alloy.

In another aspect of the present disclosure, a pressure sensor is provided. The pressure sensor includes a housing having an opening, a membrane coupled to the housing at the opening, a tensioning plate positioned parallel to the membrane with a gap between the tensioning plate and the membrane, a bonding ring coupled to the membrane and the tensioning plate, wherein the tensioning plate is configured to apply a tensile force to the membrane through the bonding ring, and a sensor circuit in the housing configured to generate a pressure signal based on a deflection of the membrane.

In one embodiment, the bonding ring is an electrical insulator, the membrane comprises an electrode, the tensioning plate comprises a counter electrode, and the sensor circuit is configured to evaluate a capacitance between the electrode and the counter electrode.

In one embodiment, the bonding ring comprises an adhesive and a plurality of spherical spacers, each of the plurality of spherical spacers having a single diameter, and each of the plurality of spherical spacers being an electrical insulator.

In another aspect of the present disclosure, a method of fabricating a pressure sensor is provided. The method includes heating a membrane having a first coefficient of thermal expansion and a tensioning ring having a second coefficient of thermal expansion lower than the first coefficient of thermal expansion to a temperature outside an operating temperature range of the pressure sensor, bonding the tensioning ring to the membrane at the temperature outside the operating temperature range of the pressure sensor while the membrane experiences greater expansion than the tensioning ring, and fixing the membrane and the tensioning ring to a sensor housing comprising a sensor circuit while the membrane and the sensor housing are at about the same temperature.

In one embodiment, the fixing of the membrane and the tensioning ring to the sensor housing is bonding the sensor housing to an area of the membrane outside the area bonded to the tensioning ring.

In another aspect of the present disclosure, a method of fabricating a pressure sensor is provided. The method includes heating a membrane having a first coefficient of thermal expansion and a tensioning plate having a second coefficient of thermal expansion lower than the first coefficient of thermal expansion to a temperature outside an operating temperature range of the pressure sensor, bonding the tensioning plate to the membrane with a bonding ring at the temperature outside the operating temperature range of the pressure sensor while the membrane experiences greater expansion than the tensioning plate, and fixing the membrane and the tensioning plate to a sensor housing comprising a sensor circuit while the membrane and the sensor housing are at about the same temperature.

In one embodiment, the fixing of the membrane and the tensioning plate to the sensor housing comprises bonding the sensor housing to an area of the membrane outside the area bonded to the tensioning plate by the bonding ring.

In another aspect of the present disclosure, a pressure sensor is provided. The pressure sensor includes a membrane, the membrane comprising an electrode, a counter electrode positioned parallel to the membrane, a spacer between the membrane and the counter electrode, the spacer having a first thickness between the membrane and the counter electrode, a dielectric between the membrane and the counter electrode, the dielectric having a second thickness less than the first thickness of the spacer, and a sensor circuit configured to evaluate a capacitance between the electrode and the counter electrode.

In one embodiment, the membrane is configured to not be in contact with the dielectric when under pressures in a first pressure range, and the membrane is configured to be in contact with the dielectric when under pressures in a second pressure range.

In one embodiment, the sensor circuit is configured to measure the capacitance over the first pressure range and the second pressure range.

In one embodiment, the pressure sensor has a first dynamic range when the membrane does not contact the dielectric, and a second dynamic range when the membrane does contact the dielectric.

In one embodiment, the membrane is configured to come in contact with the dielectric at pressures within an operating pressure range of the pressure sensor.

In one embodiment, the membrane is configured to contact the dielectric and wherein the sensor circuit generates a pressure signal based on an amount of a surface area of the membrane in contact with the dielectric.

In one embodiment, the pressure sensor includes a tensioning ring to apply a tensile force to the membrane.

These and other features and aspects of the present invention will be more fully understood when considered with respect to the following detailed description, appended claims, and accompanying drawings.

BRIEF DESCRIPTION OF THE DRAWINGS

The accompanying drawings, together with the specification, illustrate preferred and example embodiments of the present invention, and, together with the description, serve to explain the principles of the present invention.

FIG. 7A is an exploded view of a ring-tensioned membrane for a capacitive sensor according to embodiments of the present disclosure.

FIG. 7B is a cross section view of a ring-tensioned membrane for a capacitive sensor according to embodiments of the present disclosure.

DETAILED DESCRIPTION

Figure 1:
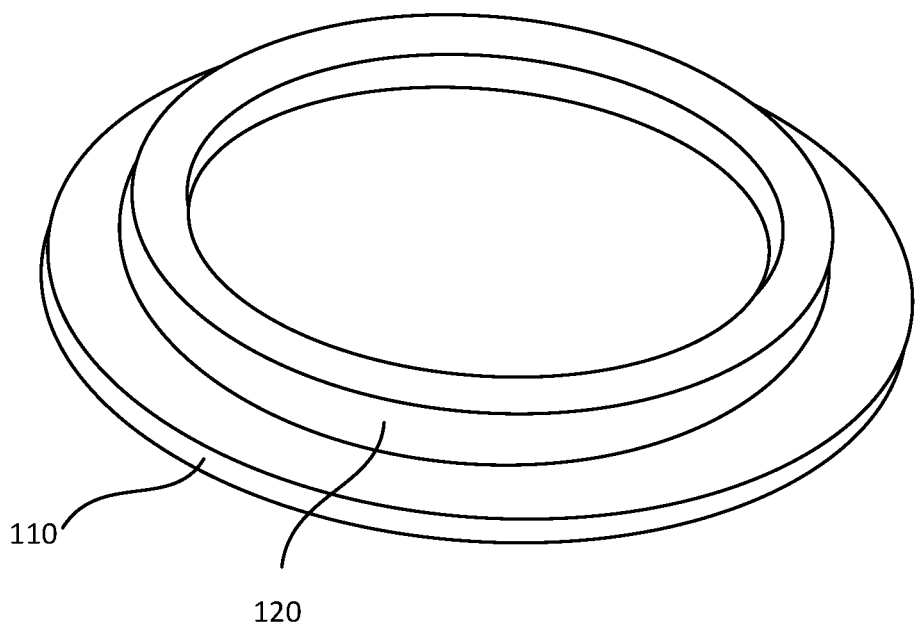
FIG. 1 is a ring-tensioned membrane according to embodiments of the present disclosure.

In the following detailed description, only certain example embodiments of the present invention are shown and described, by way of illustration. As those skilled in the art would recognize, the invention may be embodied in many different forms and should not be construed as being limited to the embodiments set forth herein. Descriptions of features or aspects within each example embodiment should typically be considered as available for other similar features or aspects in other example embodiments. Like reference numerals designate like elements throughout the specification.

FIG. 1 is a ring-tensioned membrane according to embodiments of the present disclosure. The membrane 110 may be used in a pressure sensor which measures the deflection of the membrane 110 to detect the difference in pressure applied to opposite faces of the membrane 110. In some embodiments, for example where the membrane is used in an implantable pressure sensor, the membrane may be made of a biocompatible material such as titanium, a titanium alloy, and/or stainless steel.

A tensioning ring 120 is coupled to the membrane 110. The tensioning ring 120 has an outer (e.g. circumferential) region which may directly or indirectly contact the membrane surrounding an inner region which does not contact the membrane 110. The tensioning ring 120 may be made of a metal, for example molybdenum, a metal alloy, for example Kovar or Invar, and/or another material, for example fused silica, silicon, glass, or a ceramic. The tensioning ring 120 may be bonded to the membrane 110. For example, in some embodiments, the tensioning ring 120 is welded or soldered to the membrane 110. In other embodiments, they are bonded together using an adhesive such as an epoxy.

The tensioning ring 120 applies a tensile force to the portion of the membrane 110 inside the area bonded to the tensioning ring 120 (hereinafter 'the inner portion of the membrane') (e.g. the tensioned region). This tensile force may pull the membrane flat, reducing or eliminating warping of the membrane 110 which may have occurred during the production process. The tensioning ring 120 may apply the tensile force to the membrane 110 because the membrane 110 contracts relative to the tensioning ring 120 after they are bonded together. In some embodiments, the tensioning ring 120 has a lower coefficient of thermal expansion (CTE) than the membrane 110. The pressure sensor has an operating temperature range, referring to the temperatures which the pressure sensor may be expected to be exposed to during typical operation. This operating temperature range may vary based on the intended application of the pressure sensor. For example, where the pressure sensor is an implantable pressure sensor, the operating temperature range may be the temperatures expected to be experienced within the human body. Both the tensioning ring 120 and the membrane 110 are heated to a temperature above the anticipated operating temperature of the pressure sensor when they are bonded together, and both will contract when reduced to temperatures in the operating temperature range. The membrane 110 will contract more than the tensioning ring 120 based on its lower CTE, resulting in the tensioning force. Alternatively, in another embodiment, the membrane 110 is heated at the time of bonding, resulting in expansion, but the tensioning ring 120 is not heated or is heated to a lesser degree. The tensioning ring 120 may have a greater stiffness than the membrane 110 (e.g. a greater relative stiffness) which causes the membrane 110, not the ring 120, to be deformed by the tensile force.

Figure 2:
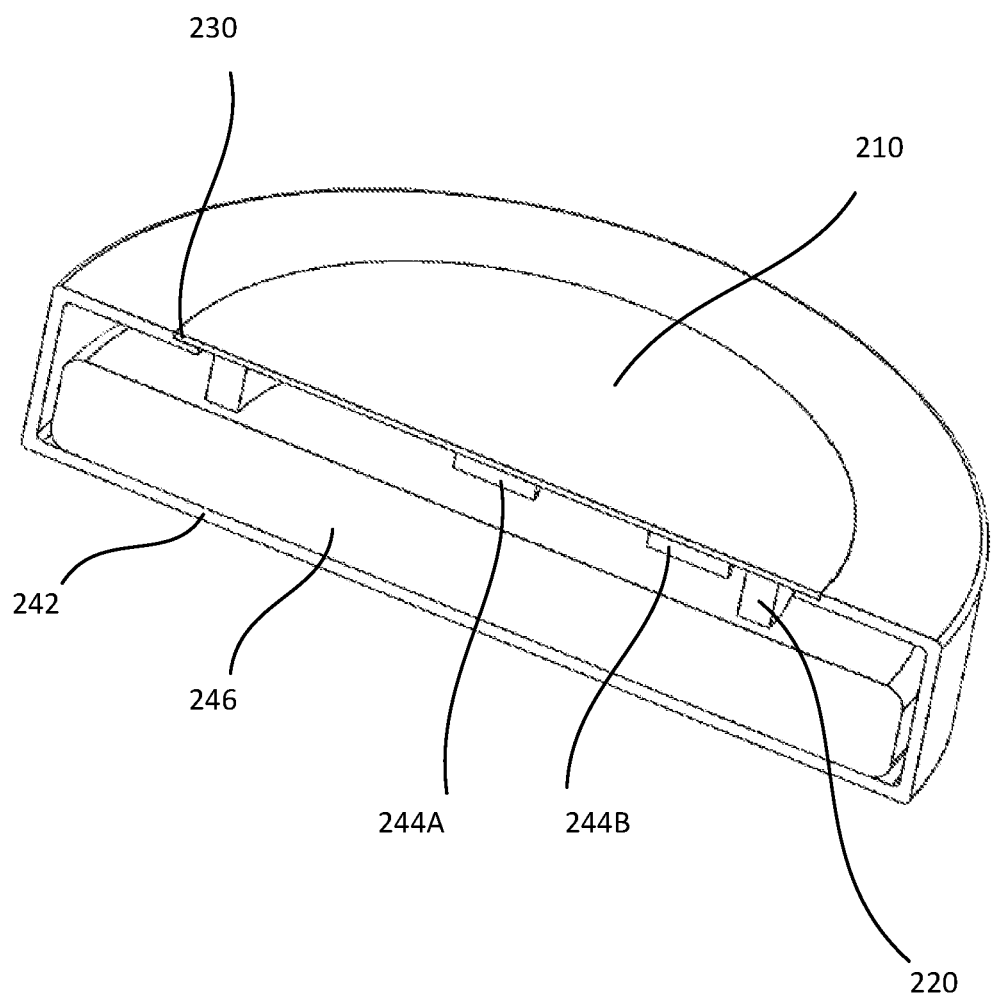
FIG. 2 is a cross sectional perspective view of an embodiment of a pressure sensor utilizing a ring-tensioned membrane according to embodiments of the present disclosure.

FIG. 2 is an embodiment of a pressure sensor utilizing the ring-tensioned membrane of FIG. 1. The membrane 210, tensioned by the tensioning ring 220, is coupled to a housing 242, defining a hermetically sealed cavity inside the housing 242. The housing 242 may be bonded to the membrane 210 at an area 230 outside the area bonded to the tensioning ring 220 (hereinafter 'the outer portion of the membrane') (e.g., the non-tensioned region). In some embodiments, this bond is made through laser welding. The tensioning ring 220 may isolate the inner portion of the membrane 210 from any warping or other defects introduced during the process of bonding the housing 242 to the outer portion of the membrane 210. In some embodiments, the membrane 210 and the housing 242 are at approximately the same temperature when bonded together, and/or the membrane 210 and the housing 242 have approximately the same CTE.

The pressure sensor includes a sensor circuit to measure the deflection of the inner portion of the membrane 210 due to a difference in pressure on opposite faces of the membrane 210. The sensor circuit may include one or more of a capacitive, piezo-electric, piezo-resistive, strain gauge, optical, and/or other circuit which measures the deflection of the inner portion of the membrane 210. For example, first and second sensor elements 244A and 244B are positioned on the inner portion of the membrane 210 to measure the deflection thereof. The pressure sensor may include electronics 246 in the housing 242. The electronics 246 may include a controller which receives a pressure signal from the sensor or sensors and/or a battery. The pressure sensor may generate a relative pressure signal, referring to a pressure signal showing changes in the pressure measured, rather than an absolute measured pressure value.

In some embodiments, the pressure sensor of FIG. 2 is an implantable medical device incorporating a pressure sensor, and the electronics 246 additionally or alternatively include circuitry for the implantable medical device. For example, in one embodiment, the housing 242 is a related art implantable pulse generator housing with an opening in the side and the membrane 210 is integrally bonded to seal the opening. The electronics 246 include implantable pulse generator circuitry. A controller receives the pressure signal from the sensor circuit and controls the timing or characteristics of stimulation applied by the implantable pulse generator circuitry.

In one embodiment, instead of being a separate element bonded to the housing 242, the membrane 210 is a thinner portion of the housing 242 and the tensioning ring 220 is bonded to the thinner portion of the housing 242, applying a tensile force to the housing to reduce or eliminate defects such as defects introduced in fabrication of the housing or creating the thinner portion of the housing 242.

Figure 3A:
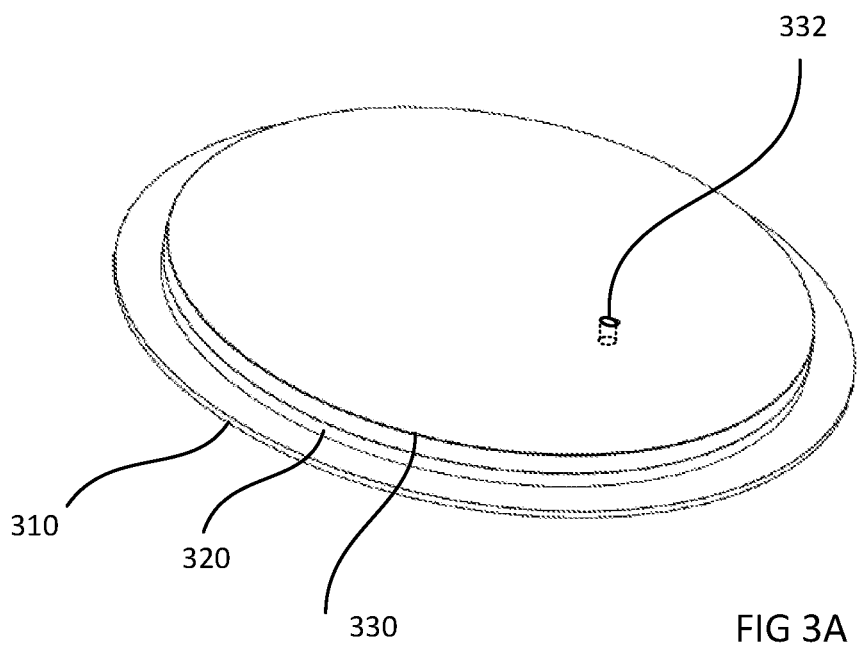
FIG. 3A is a plate-tensioned membrane according to embodiments of the present disclosure.
Figure 3B:
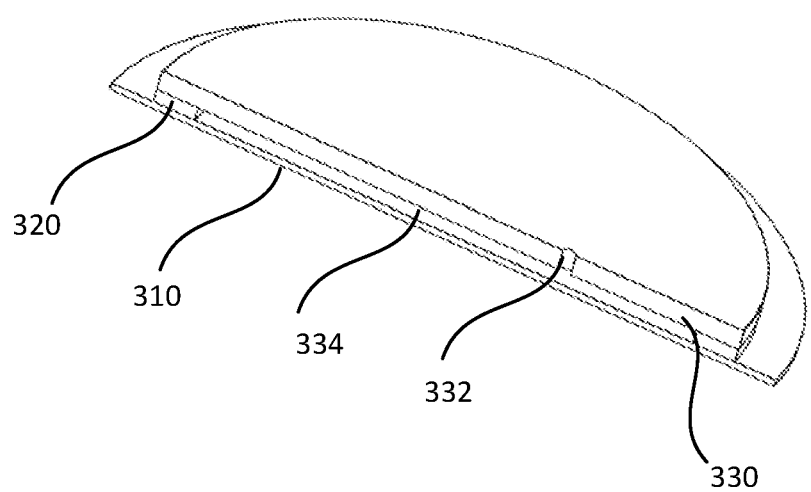
FIG. 3B is a cross sectional perspective view of the plate-tensioned membrane of FIG. 3A.

FIG. 3A is a plate-tensioned membrane according to embodiments of the present disclosure. FIG. 3B is a cross section of the plate-tensioned membrane of FIG. 3A. A bonding ring 320 bonds a tensioning plate 330 to a membrane 310. The bonding ring 320 has an outer (e.g. circumferential) region which contacts the membrane surrounding an inner region which does not contact the membrane 310. The tensioning plate 330 is parallel to the membrane 310, with a gap 334 between the membrane 310 and the tensioning plate 330 in the inner region of the bonding ring 320. In some embodiments, a vent hole 332 is included in the tensioning plate 330. The membrane 310 may deflect into the gap 334 when under pressure.

The tensioning plate 330 may apply the tensile force to the membrane 310 via the bonding ring 320. The tensioning plate 330 may be made of a metal, for example molybdenum, a metal alloy, for example Kovar or Invar, and/or another material, for example fused silica, silicon, glass, or a ceramic. In some embodiments, the tensioning plate 330 has a lower CTE than the membrane 310 and the tensioning plate 330, the bonding ring 320, and the membrane 310 are heated to a temperature above the anticipated operating temperature range for the pressure sensor when they are bonded together. The membrane 310 will contract more than the tensioning plate 330 based on its lower CTE, and the bonding ring 320 will accordingly apply a tensile force to the membrane 310 in the operating temperature range due to being bonded between the two. Alternatively, the membrane 310 may be heated at the time of bonding, resulting in expansion, but the tensioning plate 330 may not be heated or may be heated to a lesser degree.

Figure 4:
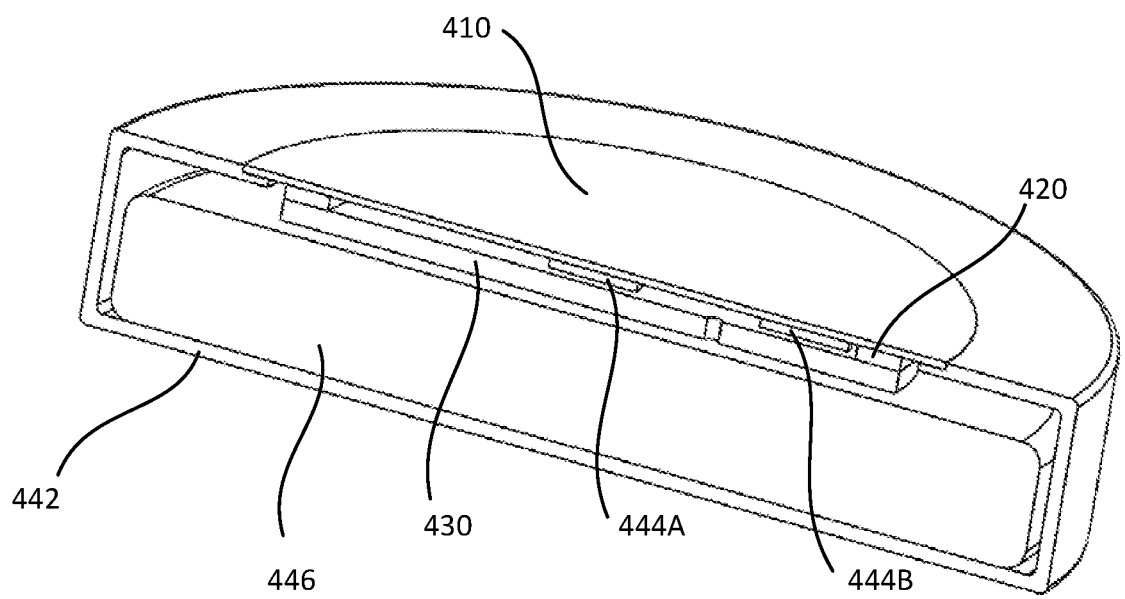
FIG. 4 is a cross sectional perspective view of an embodiment of a pressure sensor utilizing a plate-tensioned membrane according to embodiments of the present disclosure.

FIG. 4 is an embodiment of a pressure sensor utilizing the plate-tensioned membrane of FIGS. 3A and 3B. The membrane 410, tensioned by the tensioning plate 430 via the bonding ring 420, is coupled to a housing 442. The housing 442 is bonded to the outer portion of the membrane 410. Electronics 446 and first and second sensors 444A and 444B may function as described above in reference to the electronics 246 and first and second sensors 244A and 244B of FIG. 2. In one embodiment, an electrode is coupled to the membrane 410 (or the membrane 410 is utilized as an electrode), tensioning plate 430 is coupled to a counter electrode (or utilized as a counter electrode), and the electrode (e.g., 410) and counter electrode (e.g., 430) are utilized as a capacitive pressure sensor. The bonding ring 420 may be an electrical insulator, preventing electrical contact between the electrode and the counter electrode.

Figure 5:
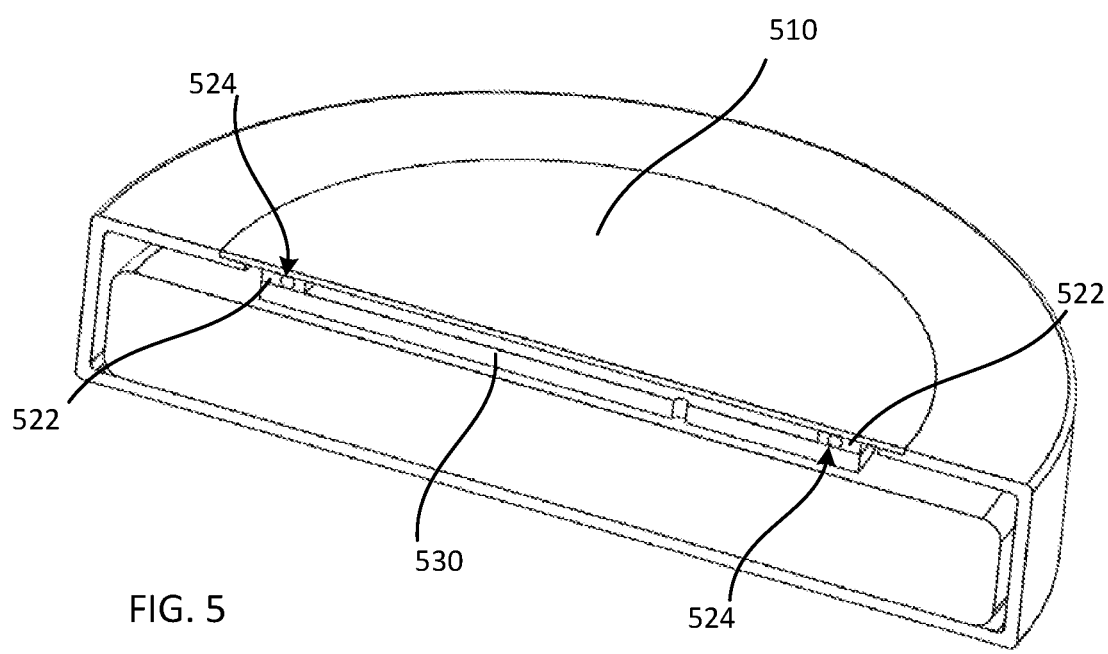
FIG. 5 is a cross sectional perspective view of an embodiment of a pressure sensor according to embodiments of the present disclosure.

FIG. 5 is an embodiment of a pressure sensor according to embodiments of the present disclosure. The pressure sensor includes a membrane 510 and a tensioning plate 530 which may be the membrane 410 and the tensioning plate 430 referred to in FIG. 4. The membrane 510 and the tensioning plate 530 are bonded together by a bonding ring which is made of an adhesive 522 filled with spacing elements 524. The spacing elements 524 may have a uniform thickness to provide a uniform distance between the membrane 510 (when not deflected due to pressure) and the tensioning plate 530. In some embodiments, the spacing elements 524 are spheres of a uniform diameter. The spacing elements 524 are interspersed throughout the bonding ring, immersed in the adhesive 522. The adhesive 522 may be an epoxy, and/or may be electrically insulating. The adhesive 522 holds the spacing elements 524 in place and bonds the tensioning plate 530 to the membrane 510, transferring the tensile force. In embodiments which utilize the membrane 510 as an electrode and the tensioning plate 530 as a counter electrode, both the adhesive 522 and the spacing elements 524 may be electrical insulators. In some embodiments, the spacing elements 524 are glass or include glass.

Figure 6A:
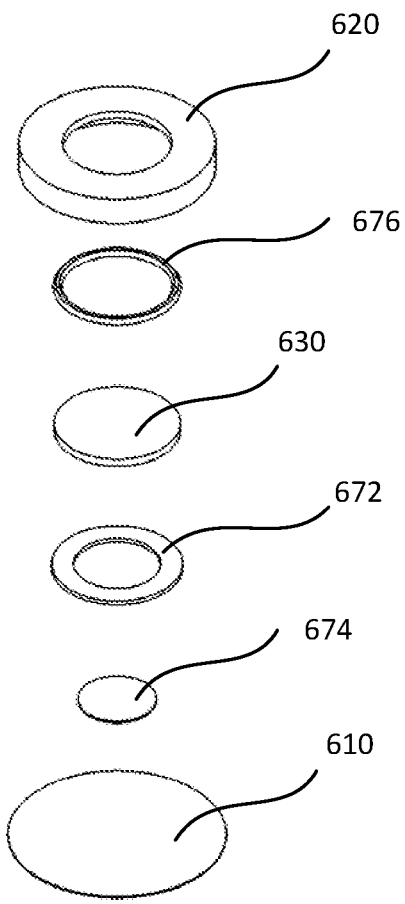
FIG. 6A is an exploded view of a ring-tensioned membrane for a capacitive sensor according to embodiments of the present disclosure.
Figure 6B:
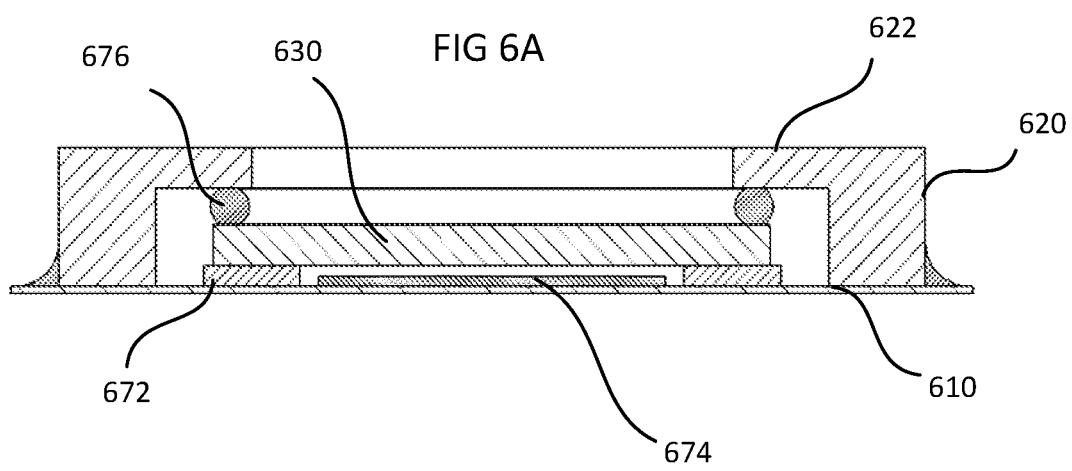
FIG. 6B is a cross section view of the ring-tensioned membrane of FIG. 6A.

FIG. 6A is an exploded view of a ring-tensioned membrane for a capacitive sensor according to embodiments of the present disclosure. FIG. 6B is a cross section view of the ring-tensioned membrane of FIG. 6A.

In the ring-tensioned membrane of FIGS. 6A and 6B, a tensioning ring 620 again applies a tensile force to a membrane 610. This may be accomplished as described above. The tensioning ring 620 includes a retaining element 622. The retaining element 622 biases an isolator 676 against a counter electrode 630, which in turn biases a spacer 672 against the membrane 610. The membrane 610 includes an electrode (or is utilized as an electrode). In some embodiments, a dielectric 674 may be included between the membrane 610 and the counter electrode 630 to increase the dynamic range of the pressure sensor, for example in the manner discussed below in reference to FIGS. 8-10.

In some embodiments, the retaining element 622 may be a ridge on the inner edge of the tensioning ring 620, as shown in FIGS. 6A and 6B. In another embodiment, the retaining element 622 is a portion of the tensioning ring 620 set back from the membrane 610 which does not have the open inner area, and which therefore encloses the isolator 676, the counter electrode 630, and the spacer 672 between the tensioning ring 620 and the membrane 610.

The Isolator 676 and/or the spacer 672 may be electrical insulators. The isolator 676 prevents the counter electrode from making electrical contact with the tensioning ring 620. This arrangement may allow both the tensioning ring 620 and the membrane 610 to be made of conductive materials such as metals and allow the retaining element 622 of the tensioning ring 620 to bias the counter electrode 630 against the membrane 610 without shorting the membrane 610 and the counter electrode 630. It may also facilitate easy coupling of the electrode of the membrane 610 and the counter electrode 630 to a sensor circuit—connection may be made with the tensioning ring 620 instead of the electrode of the membrane 610, in close proximity to the counter electrode 630.

The spacer 672 is positioned between the membrane 610 and the counter electrode 630. It provides a uniform distance between the two at the periphery, but includes an empty (or thinner) inner area. The membrane 610 is configured to deflect into the inner area of the spacer 672 when under pressure. The tensioning ring 620 applies the tensile force to the membrane 610, so the spacer 672 need not do so. The spacer 672 may not need to be a ring enclosing the inner area of the membrane 610 which will deflect under pressure, and may take additional/alternative forms. For example, the spacer 672 may be a plurality of spacers positioned periodically at or near the circumferential periphery of the counter electrode 630.

In some embodiments, the isolator and the spacer are a single piece. For example, FIG. 7A is an exploded view and FIG. 7B is a cross section view of the ring-tensioned membrane for a capacitive sensor shown in FIGS. 6A and 6B where a spacer 770 with isolator protrusions 776 acts as both the isolator and the spacer. When the spacer 770 is positioned between the membrane 610 and the counter electrode 630, the isolator protrusions 776 wrap around the outside edges of the counter electrode 630, preventing it from coming into contact with the tensioning ring 620. The dielectric 674 may also be combined into the single piece with the spacer 770 and the isolator protrusions 776.

Figure 8A:
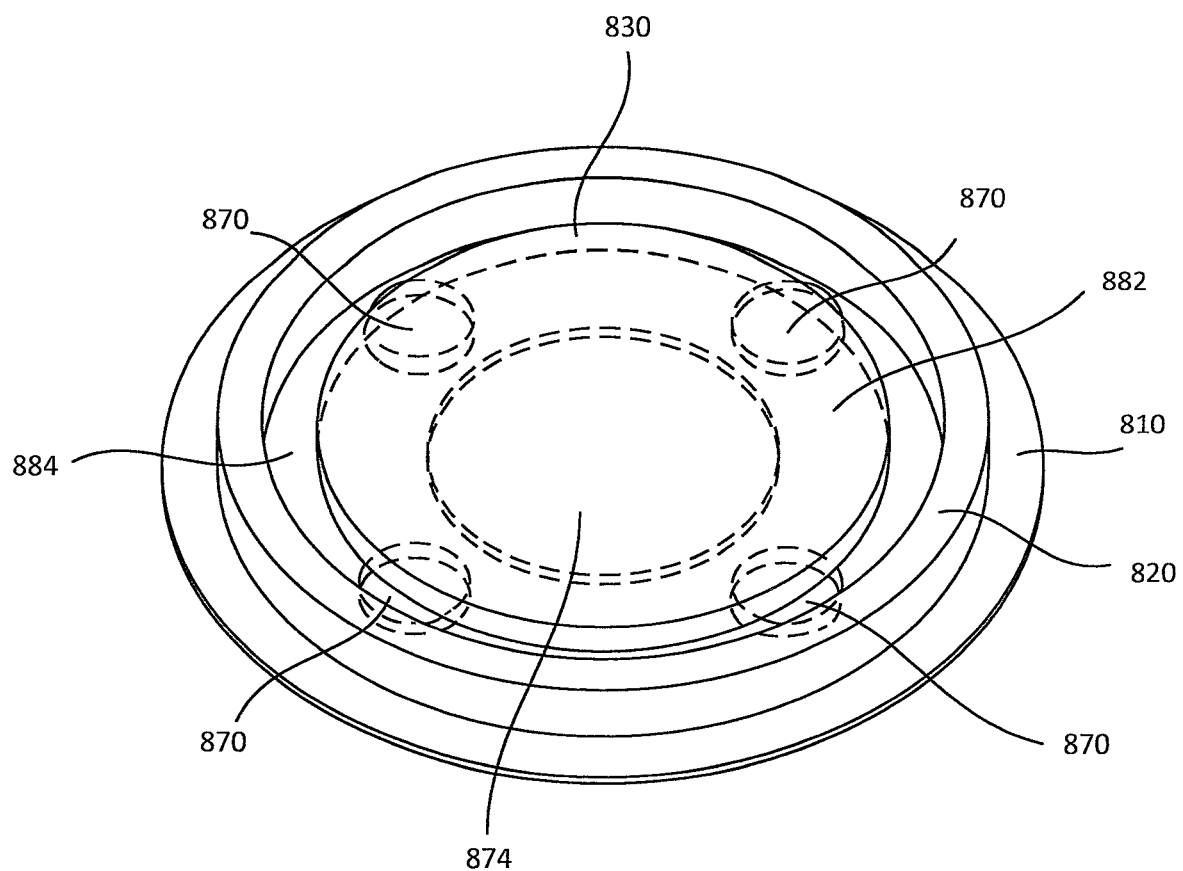
FIG. 8A is an assembly for a capacitor for a capacitive pressure sensor having an increased dynamic range according to embodiments of the present disclosure.
Figure 8B:
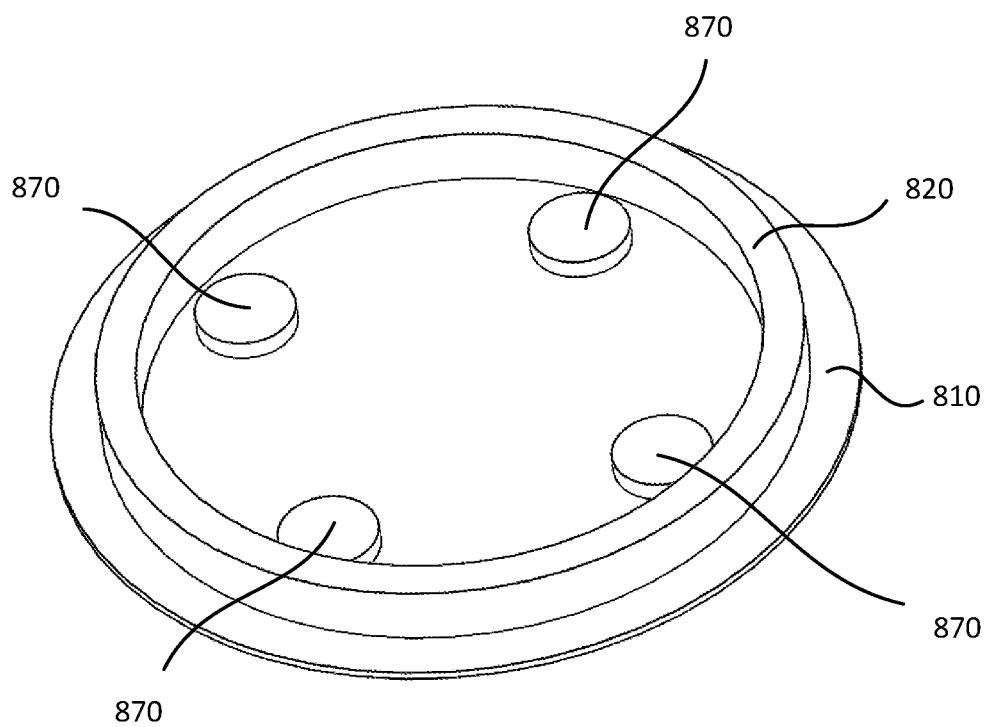
FIG. 8B is a first subassembly of the capacitive sensor of FIG. 8A.
Figure 8C:
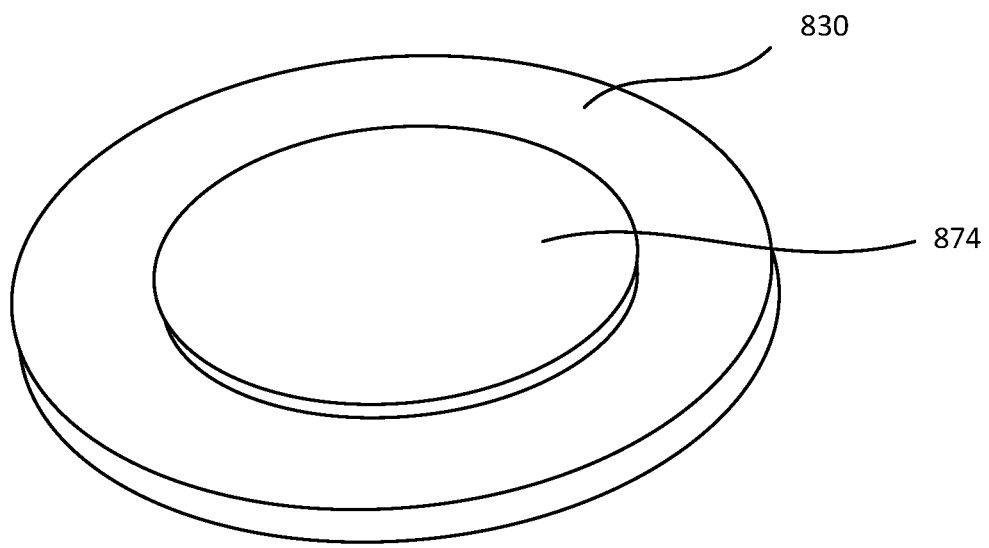
FIG. 8C is a second subassembly of the capacitive sensor of FIG. 8A.
Figure 8D:
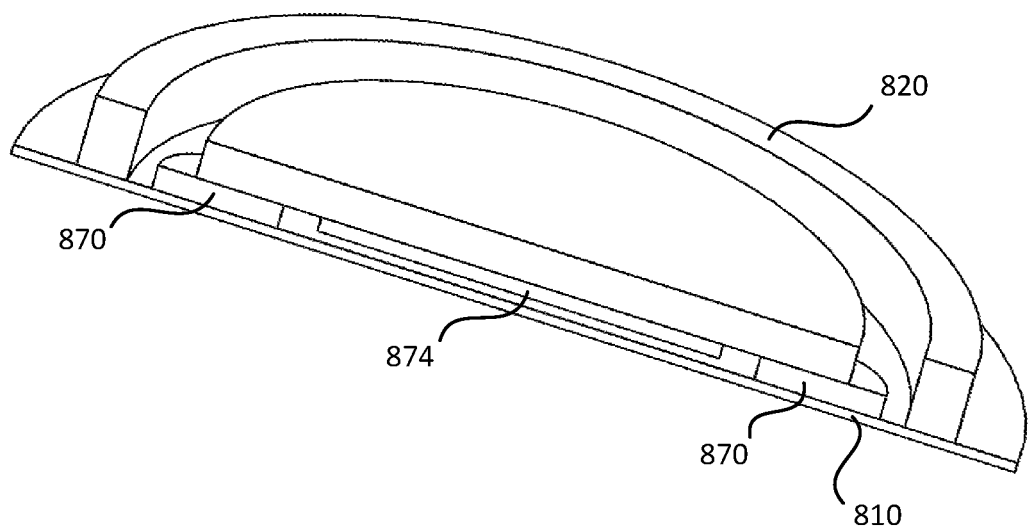
FIG. 8D is a cross section view of the assembly for the capacitive sensor of FIG. 8A.
Figure 10:
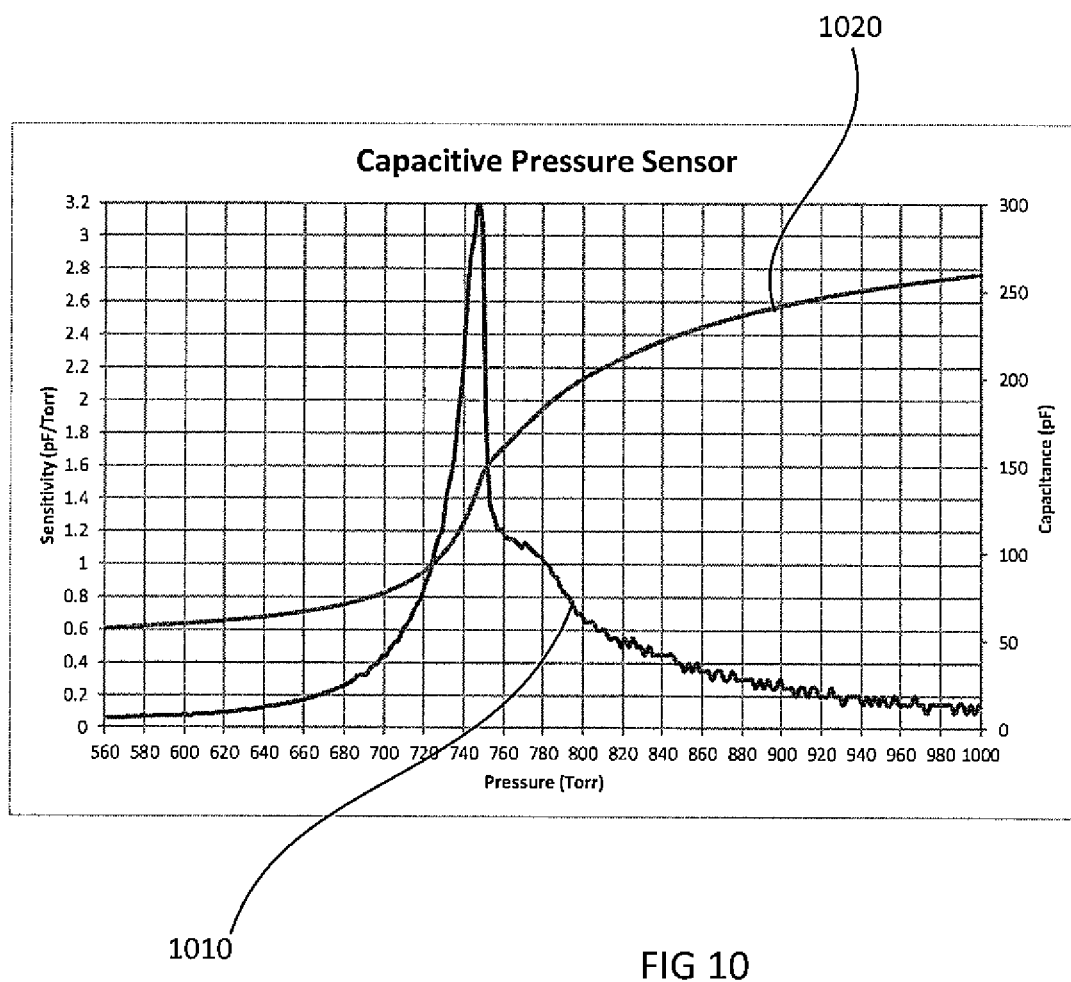
FIG. 10 is a graph depicting the capacitance and sensitivity at given pressures of a capacitive pressure sensor according to embodiments of the present disclosure.

FIG. 8A is a capacitor for a capacitive pressure sensor having an increased dynamic range according to embodiments of the present disclosure (see, e.g., FIG. 10). FIG. 8B is a first subassembly of the capacitor of FIG. 8A. FIG. 8C is a second subassembly of the capacitor of FIG. 8A. FIG. 8D is a cross section view of the capacitor of FIG. 8A.

In some embodiments, the membrane 810 is coupled to a tensioning ring 820 and the tensioning ring 820 applies a tensile force to the inner portion of the membrane 810, as described above.

An electrode of the capacitor is included in the membrane 810. In some embodiments, the membrane 810 is metal or another conductive material and the membrane 810 is the electrode. In other embodiments, the membrane 810 is coated or sputtered with the conductive material. A first wire 884 is coupled to the electrode and to a sensor circuit configured to measure the capacitance of the capacitor to generate a pressure signal.

A counter electrode 830 is positioned parallel to the membrane 810. A second wire 882 is coupled to the counter electrode 830 and to the sensor circuit to generate the pressure signal by measuring the capacitance between the electrode of the membrane 810 and the counter electrode 830. In some embodiments, a plurality of spacers 870 are positioned between the membrane 810 and the counter electrode 830. In an alternative embodiment, the plurality of spacers 870 are replaced with or used in conjunction with a single spacer with a central opening, for example, a ring-shaped spacer. In one embodiment, spacers 870 are coupled to the membrane 810 as shown in FIG. 8B. In other embodiments, the spacers 870 may be coupled to the counter electrode 830 or may simply be biased between the membrane 810 and the counter electrode 830. The thickness of the spacers 870 may define the distance between the counter electrode 830 and the membrane 810 when the membrane is not deflected due to a pressure differential. The spacers 870 extend around the periphery of the portion of the membrane 810 which deflects under pressure, leaving a gap between the membrane 810 and the counter electrode 830 for the membrane 810 to deflect into.

A dielectric 874 is positioned in the gap between the counter electrode 830 and the membrane 810. The dielectric 874 is a solid. It may have a low relative dielectric constant. For example, the dielectric 874 may be Teflon, a cyclic olefin polymer (COP), and/or a thin sheet of glass. Its thickness does not span the distance between the counter electrode 830 and the membrane 810, so the membrane 810 can still deflect into the gap due to pressure. The dielectric 874 may be coupled to the counter electrode 830. In some embodiments, the dielectric 874 and the spacer or spacers 870 may be combined as one or more pieces of contiguous electrically insulating material.

In some embodiments, the dielectric 874 is coated or plated directly onto the counter electrode 830. In some embodiments, the dielectric 874 is an oxide layer on metal forming the counter electrode 830 or the membrane 810.

The pressure sensor has an operating pressure range which is the range of pressures the pressure sensor is expected to experience during operation. The operating pressure range of the pressure sensor which utilizes the capacitor may include two ranges. In a first range, the membrane 810 deflects into the gap without coming into contact with the dielectric 874. In a second range, the membrane 810 deflects into the gap and comes into contact with the dielectric 874 (the membrane bottoms out). The dielectric 874 may be positioned at the point where the magnitude of the deflection of the membrane 810 is greatest. Increasing levels of pressure on the membrane 810 will not cause the membrane 810 to deflect any deeper into the gap. Instead, increased pressure causes more of the inner surface area of the membrane 810 to press against the surface of the dielectric 874.

The sensor circuit may measure the capacitance in this second range in the course of normal, expected operation. Because the change in capacitance is caused by the deflection expanding outward in the membrane 810, rather than the membrane 810 deflecting further toward the counter electrode 830, the capacitor does not need as much space between the membrane 810 and the counter electrode 830 and may have a smaller profile. The distance between the membrane 810 and the dielectric 874 may be configured such that the pressure sensor would have lower sensitivity in the second range if it were allowed to deflect further into the gap without contacting the dielectric 874.

In one embodiment, the dielectric 874 is positioned between the membrane 810 and the counter electrode 830. A first region of the inner surface area of the membrane 810 is in contact with the dielectric 874, while a second region of the inner surface area of the membrane 810 is not in contact with the dielectric 874. Depending on the pressure differential between the pressure on the inner face of the membrane 810 and the outer face of the membrane 810, the size of the first region may increase or decrease. The capacitance between the membrane 810 and the counter electrode 830 changes based on the size of the first region, so the pressure sensor may generate a pressure signal based on the capacitance of the size of the first region. As a result, the pressure sensor may have an improved dynamic range.

In some embodiments, the pressure sensor may be configured to have at least some portion of the membrane 810 in contact with the dielectric 874 during the entire operating pressure range of the pressure sensor. In some embodiments, the pressure inside the pressure sensor may be set at a level to place the pressure differential on the membrane 810 at a desired level in the operating pressure range of the pressure sensor. For example, the pressure sensor may be sealed in an environment with a reduced ambient pressure so that the pressure differential on the membrane 810 will cause a larger deflection when the external pressure is in the operating pressure range.

Figure 9:
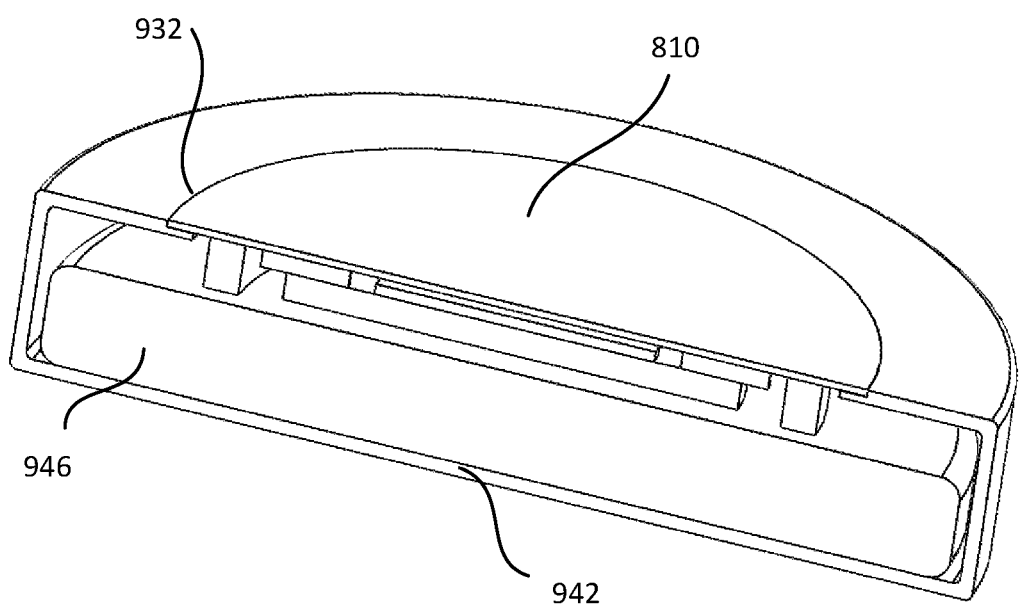
FIG. 9 is a cross sectional perspective view of an embodiment of a capacitive pressure sensor utilizing a capacitor according to embodiments of the present disclosure.

FIG. 9 is an embodiment of a capacitive pressure sensor utilizing the capacitor of FIGS. 8A and 8B. An outer portion 932 of the membrane 810 is bonded to the housing 942. The electronics 946 may be coupled to the electrode and the counter electrode 830 to measure the capacitance between the two, monitor changes in the capacitance due to deflection of the membrane 810, and generate a pressure signal based on the capacitance and/or the changes in capacitance.

Sensor Performance Example

An experiment was performed to measure the performance of a pressure sensor according to embodiments of the present disclosure. A capacitive pressure sensor having a dielectric between the membrane and the counter electrode was tested over a pressure range from 560 torr to 1000 torr to determine its dynamic range. The membrane was titanium 6-4 with a thickness of 0.17 mm and a diameter of 45 mm. The counter electrode was 0.5 mm thick with a 30 mm diameter. A tensioning ring tensioning the membrane had an inner diameter of 34 mm and an outer diameter of 45 mm with a thickness of 3 mm. The spacer between the membrane and the counter electrode was 110 micrometers thick, and a 25 micrometer thick Teflon film dielectric was inserted between the membrane and the counter electrode. FIG. 10 shows the results of the experiment, including both the capacitance 1010 of the capacitor and the sensitivity 1020 of the sensor at a given pressure. Sensitivity, in this context, refers to the ability of the sensor to detect changes in pressure, not an absolute pressure value. Accordingly, sensitivity as used here is the slope of capacitance over pressure or the change in capacitance over the change in pressure. From 560 torr to approximately 750 torr, the membrane did not contact the dielectric. At approximately 750 torr, the membrane contacted the dielectric. At that point, the slope of the capacitance 1010 decreases noticeably. At the same point, the slope of the sensitivity 1020 increases noticeably (the sensitivity 1020 decreases at a lower rate).

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "Including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A pressure sensor comprising: a membrane, the membrane comprising an electrode; a counter electrode positioned parallel to the membrane; a spacer between the membrane and the counter electrode, the spacer having a first thickness between the membrane and the counter electrode; a dielectric between the membrane and the counter electrode, the dielectric having a second thickness less than the first thickness of the spacer; a sensor circuit configured to evaluate a capacitance between the electrode and the counter electrode; and a tensioning ring to apply a tensile force to the membrane; wherein the membrane has a non-tensioned region; the non-tensioned region is an area of the membrane outside the tensioning ring and the non-tensioned region of the membrane is bonded to a housing.

2. The pressure sensor of claim 1, wherein
the membrane is configured to not be in contact with the dielectric when under pressures in a first pressure range, and
the membrane is configured to be in contact with the dielectric when under pressures in a second pressure range.

3. The pressure sensor of claim 2, wherein the sensor circuit is configured to measure the capacitance over the first pressure range and the second pressure range.

4. The pressure sensor of claim 1, wherein the pressure sensor has a first dynamic range when the membrane does not contact the dielectric, and a second dynamic range when the membrane does contact the dielectric.

5. The pressure sensor of claim 1, wherein the membrane is configured to come in contact with the dielectric at pressures within an operating pressure range of the pressure sensor.

6. The pressure sensor of claim 1, wherein the membrane is configured to contact the dielectric and wherein the sensor circuit generates a pressure signal based on an amount of a surface area of the membrane in contact with the dielectric.

7. The pressure sensor of claim 1, wherein the membrane has a first coefficient of thermal expansion, the tensioning ring has a second coefficient of thermal expansion lower than the first coefficient of thermal expansion, the membrane and the tensioning ring are configured to be bonded together when heated to above an operating temperature range while the membrane experiences greater expansion than the tensioning ring and the tensioning ring applies the tensile force to the membrane at the operating temperature range.

8. A pressure sensor comprising:
a membrane, the membrane comprising an electrode;
a counter electrode positioned parallel to the membrane;
a spacer between the membrane and the counter electrode, the spacer having a first thickness between the membrane and the counter electrode;
a dielectric between the membrane and the counter electrode, the dielectric having a second thickness less than the first thickness of the spacer;
a tensioning ring to apply a tensile force to the membrane; and
a sensor circuit configured to evaluate a capacitance between the electrode and the counter electrode,
wherein the membrane has a tensioned region and a non-tensioned region,
the tensioned region of the membrane is an area of the membrane inside the tensioning ring,
the non-tensioned region of the membrane is an area of the membrane outside the tensioning ring, and
the non-tensioned region of the membrane is bonded to a housing.

9. The pressure sensor of claim 8, wherein
the membrane is configured to not be in contact with the dielectric when under pressures in a first pressure range, and
the membrane is configured to be in contact with the dielectric when under pressures in a second pressure range.

10. The pressure sensor of claim 9, wherein the sensor circuit is configured to measure the capacitance over the first pressure range and the second pressure range.

11. The pressure sensor of claim 8, wherein the pressure sensor has a first dynamic range when the membrane does not contact the dielectric, and a second dynamic range when the membrane does contact the dielectric.

12. The pressure sensor of claim 8, wherein the membrane is configured to come in contact with the dielectric at pressures within an operating pressure range of the pressure sensor.

13. The pressure sensor of claim 8, wherein the membrane is configured to contact the dielectric and wherein the sensor circuit generates a pressure signal based on an amount of a surface area of the membrane in contact with the dielectric.

* * * * *